(12) United States Patent
Lee

(10) Patent No.: US 7,564,770 B2
(45) Date of Patent: Jul. 21, 2009

(54) TEST OPTICAL DISK AND MANUFACTURING METHOD THEREOF

(75) Inventor: Emily Lee, Taipei (TW)

(73) Assignee: Via Technologies, Inc., Taipei (TW)

( * ) Notice: Subject to any disclaimer, the term of this patent is extended or adjusted under 35 U.S.C. 154(b) by 887 days.

(21) Appl. No.: 11/082,659

(22) Filed: Mar. 18, 2005

(65) Prior Publication Data

US 2006/0159000 A1    Jul. 20, 2006

(30) Foreign Application Priority Data

Jan. 19, 2005    (TW) ............................... 94101596 A

(51) Int. Cl.
*G11B 7/24* (2006.01)
*G11B 3/70* (2006.01)

(52) U.S. Cl. .................. 369/275.1; 369/47.53; 369/286

(58) Field of Classification Search .............. 369/275.1, 369/14, 15, 47.53, 286
See application file for complete search history.

(56) References Cited

U.S. PATENT DOCUMENTS

| 6,772,378 B1 * | 8/2004 | Ishihara et al. .............. 714/704 |
| 7,266,735 B2 * | 9/2007 | Hirabayashi ................. 714/703 |
| 2004/0218476 A1 * | 11/2004 | Ishibashi et al. ......... 369/13.06 |
| 2005/0182997 A1 * | 8/2005 | Kushida et al. ............. 714/763 |

\* cited by examiner

*Primary Examiner*—Wayne R Young
*Assistant Examiner*—Brenda Bernardi
(74) *Attorney, Agent, or Firm*—Rosenberg, Klein & Lee

(57) ABSTRACT

A test optical disk and a manufacturing method thereof are provided, comprising at least one bit value at a default position in an original image data, forming an error bit by reverting the captured bit value, storing error data consisted of error bits back to the default position in the original image file to form a test image data, and writing the test image file onto an optical disk. Furthermore, the steps of setting an error amount, selecting an error mode, and selecting a distribution method are further used to determine a length of the error data and the distribution of the default position thereof. This way, not only optical disks simulating various error statuses can be produced, but also the error statuses have reproducibility to help developers to improve the optical disk technology.

15 Claims, 2 Drawing Sheets

TEST OPTICAL DISK AND MANUFACTURING METHOD THEREOF

FIELD OF THE INVENTION

The present invention is related to an optical disk and a manufacturing method thereof, and more particularly to a test optical disk and a manufacturing method thereof for not only simulating various error statuses generated, but also to help developers to improve the optical disk technology.

BACKGROUND

The progress of the data storage technology is one of the most important motive powers for the computer technology industry progressing continuously. For seeking more convenient, faster, and big volume of storage solutions, optical disks and optical disk drives were born, and the fuse of information storage revolution is ignited. Further, the optical disk drives use laser light spot with a diameter less than 1 micron to record or read equipments of data. The laser light records or reads data of optical disks by the way of untouchability; therefore, no wear or damage will be caused to the optical disks. Further, the save time of the data of the optical disks is long, and they have big volume, are easy to carry, and cost little, such that they were paid much attention by the industry and users.

However, when the optical disks were affected by some bad factors in processes of manufacturing and using, for example, dust, impure photo resist, incomplete evaporation in recording films, scuffing, dirty, and fingerprints on substrates, etc., bad reaction of reading of the optical disk will be caused. For example, when previous mentioned bad factors appear in guide in area of the optical disk, the optical disk drive may not identify manufacturing format of the optical disk or a start position and length of the recording track in reading. This way, it may cause that the entire optical disk cannot be read or only the catalog can be read but not the content of it. If the bad factors appear in the data area of the optical disk, it directly affects digital data content stored in the optical disk and causes error statuses, such as noises or sonic booms, appear when the users enjoy movies or music. If the bad factors appear in derivation area of the optical disk, then the optical disk drive cannot determine whether the data ends accurately in reading and causes error accessing because of unable to determine the length of the data.

However, no matter which factor of these bad factors causes that the optical disk drive cannot decode original signals accurately, the common reason is the bit values on the optical disk which should be 0 originally become 1, and those should be 1 originally become 0. These bad factors are always caused by accident in manufacturing or by using scuffed optical disks; therefore, the industry cannot duplicate optical disks with the same error effects to be a standard test master slice to evaluate the functions of various types of optical disk drives. Meanwhile, no optical disks which reproduce various error statuses according to needs can be provides such that developers cannot find out responding measures with respect to the bad factors.

SUMMARY OF THE INVENTION

Accordingly, how to design a test optical disk and a manufacturing method thereof with respect to the previous mentioned shortcomings of the prior art optical disks is the key point of the present invention. Not only optical disks simulating various error statuses can be produced, but also the error statuses have reproducibility to help developers to improve the optical disk technology. Therefore, It is a primary object of the present invention to provide a test optical disk and a manufacturing method thereof. Optical disks with the same error statuses are infinitely duplicated by capturing bit values at a default position in an original image data, forming error bits by reverting the captured bit values, storing the error bits back to the default position to form a test image data, and writing the test image file onto an optical disk.

It is a secondary object of the present invention to provide a test optical disk. Users can select the distribution method of error data according to needs to simulate various error statuses such that various error statuses have reproducibility and help developers to improve the optical disk technology.

It is another object of the present invention to provide a test optical disk. A test optical disk with the same condition is provided by duplicating test optical disks with common error status to test and evaluate the functions of various optical disk drives.

To achieve the previous mentioned objects, the present invention provides a test optical disk mainly comprising: a recording track for recording original data which is consisted of a plurality of bits; and at least one error data each of which is consisted of at least one error bit and set on a default position of the recording track; wherein each error bit is obtained by reversing the bits of the corresponding original data on the default position.

The present invention further provides a manufacturing method of a test optical disk mainly comprising implementing steps of: providing an original image file which comprises a plurality of bits; producing at least one error data each of which is consisted of at least one error bit each of which is obtained by capturing the bit value at the default position in the original image file and reversing it; storing the error data back to the default position in the original image file thereby forming a test image file; and writing the test image file onto an optical disk.

DETAILED DESCRIPTION

Figure 1A:
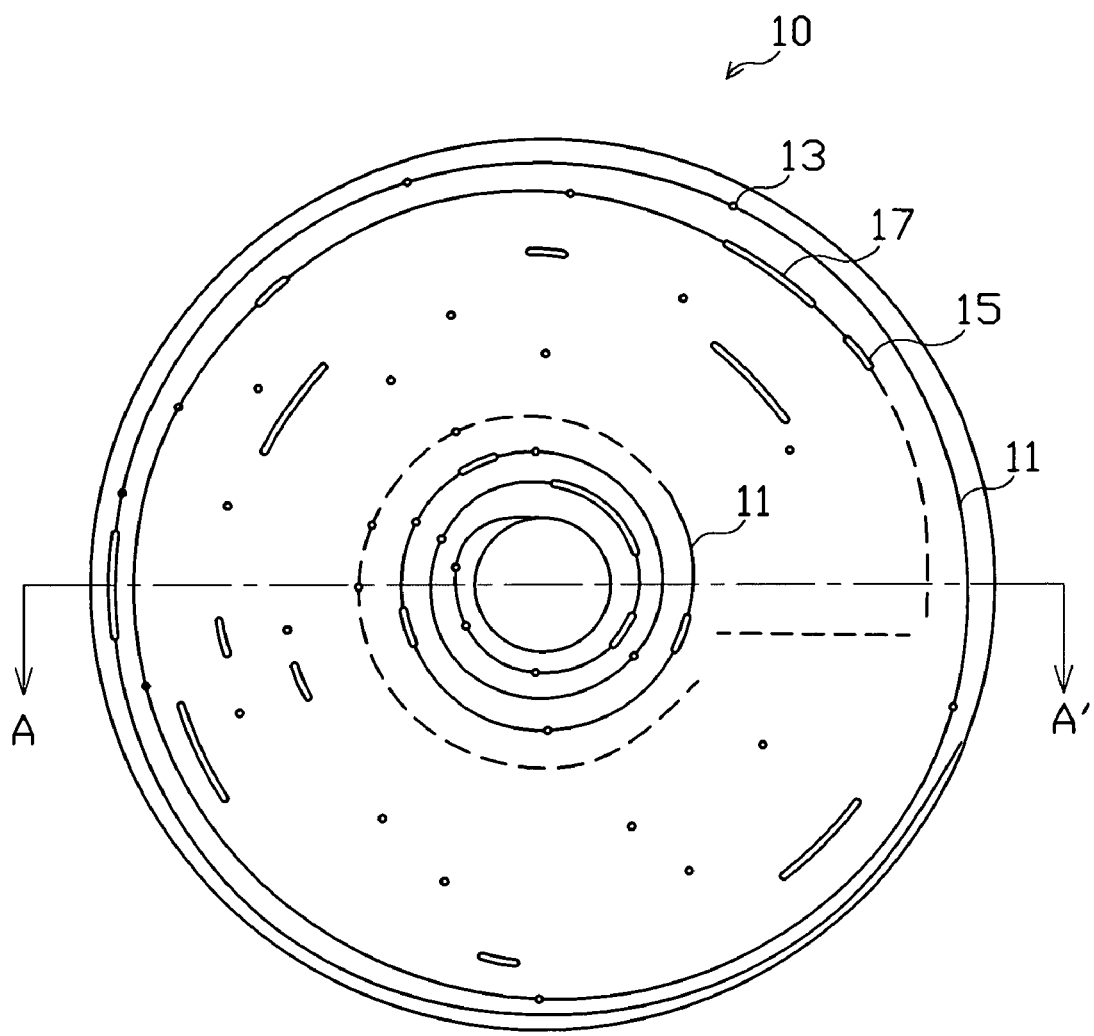
FIG. 1A and FIG. 1B are respectively a data distribution diagram and profile diagram of an optical disk of a preferred embodiment of the present invention.
Figure 1B:
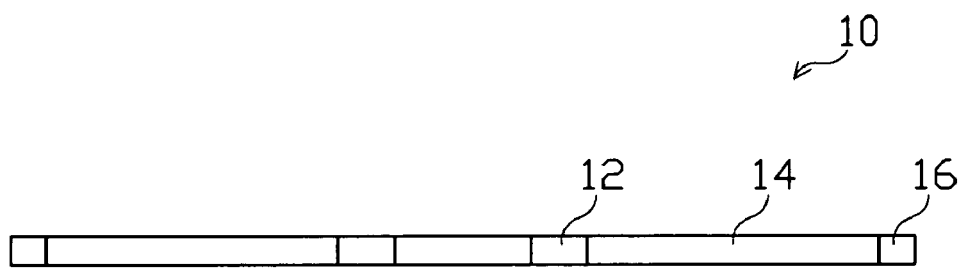
Figure 2:
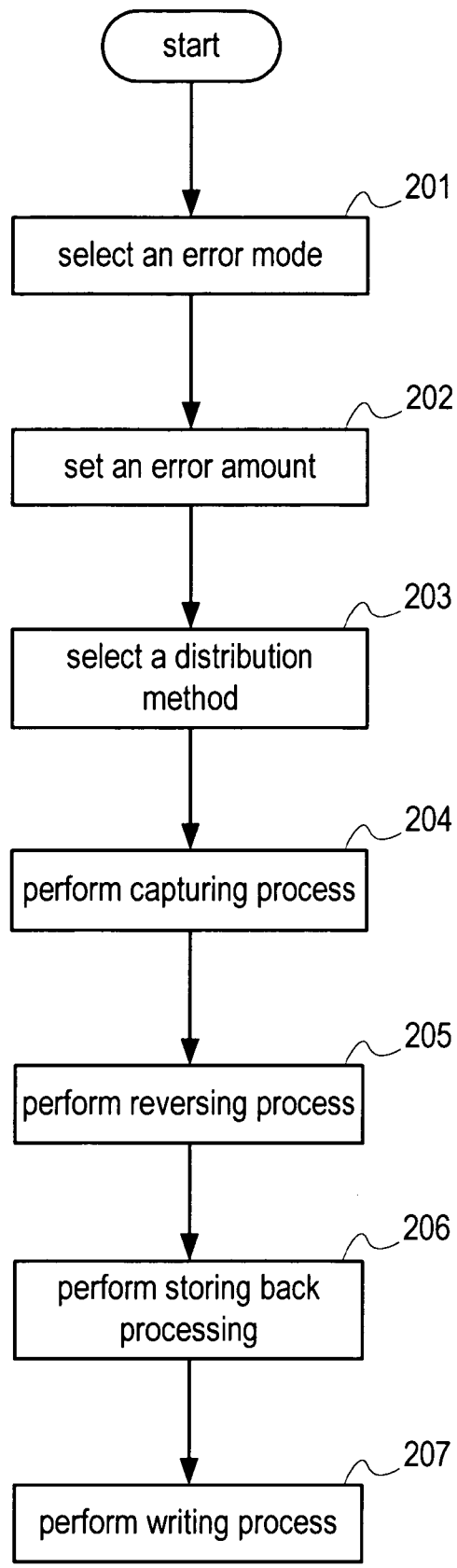
FIG. 2 is flow chart of a manufacturing method of the optical disk of the present invention.

The structural features and the effects to be achieved may further be understood and appreciated by reference to the presently preferred embodiments together with the detailed description.

Firstly, referring to each drawing, respectively a data distribution diagram, profile diagram, and flow chart of a manufacturing method of an optical disk of a preferred embodiment of the present invention. As shown, the optical disk 10 mainly comprises: a recording track 11 for recording at least one original data (not shown) which is consisted of a plurality of bits (not shown), at least one error data (13, 15, and 17) each of which is consisted of at least one error bit (not shown) and set on a default position of the recording track 11, and the error bits are obtained by reversing the bits of the corresponding original data on the default position.

Since the optical disk drive reads digital data in the optical disk by a way of emitting laser light beam on the optical disk and using the change of the intensity of its reflective light to tell the digital data on the optical disk as 0 or 1. Of course, the obtained digital data further needs to be encoded, error detected, and corrected to convert the data which users can identify. Further, the basic size needed by recording data by the optical disk is usually a basic unit as a sector (2352 bytes), which comprises data code and debug code. Both sizes are arranged differently according to different manufacturing specifications and types of the optical disks. For example, the data code of data CD has 2048 bytes, but the data code of music CD has 2352 bytes, i.e. the music CD does not have debug code, so as long as the music CD optical disk is damaged, sonic boom occurs.

Further, the probabilities of each position on the optical disk having bad factors are the same. Therefore, in the present invention, the users are allowed to set the position of the original data to be captured, retrieve the bit value of the default position, reverse it and store it to the default position, then simulating the effect of the data error. Combining with other features of the present invention, efficient evaluation can be performed to the accessibility of the optical disk drive. Further, the size of the error data on the optical disk will affect the probabilities of accessing and decoding to reduce correct data. Here, the modes of previous mentioned error data (13, 15, and 17) are classified according to the size as: an error point 13 mode, an error block 15 mode, and a sequential error area 17 mode. Therein the error point 13 mode does not have continuousness and has a length of 1 to 9 error bits to simulate an error status in a smaller range. The error block 15 mode does not have continuousness and has a length of 10 to hundreds of error bits to simulate an error status in a bit larger range. The sequential error area 17 mode has continuous period and has a length of hundreds to thousands of error bits to simulate an error status in a larger range.

The default position of the error data (13, 15, and 17) can be selected as random distribution or setting distribution to determine the distribution of the default position. Therefore, the position of the error data (13, 15, and 17) can fall in a guild-in area 12, data recording area 14, or derived area 16 according to the distribution method selected by the users. In other words, the user can set the number of the error bits in the error data and its falling position to infinitely replicate optical disks capable of simulating various error statuses. Test optical disks 10 with the same status are provided, thereby the testers capable of testing and evaluating the functions of various types of optical disk drives.

Furthermore, the manufacturing method of the test optical disk of the present invention mainly comprises the following implementing steps:

Step 201: selecting an error mode. The users select the previous mentioned error mode according to whether expected error bit has continuousness and the length of the error data (13, 15, and 17), i.e. selecting the error mode as the error point 13 mode, error block 15 mode, or sequential error area 17 mode.

Step 202: setting an error amount to determine the number of the error bits in each error data (13, 15, and 17). Corresponding parameters are set according to the error mode selected in step 201. When the error point 13 mode is selected, the number of the error bits is produced by the user entering a parameter of a point error rate. When the error block 15 mode is selected, the number of the error bits is determined by entering parameters of a block error rate and a length of the error block. When the sequential error area 17 mode is selected, the number of the error bits is determined by parameters of an error cycling rate and a length of a sequential error area.

Step 203: selecting a distribution method. Random distribution or setting distribution can be selected to determine the falling position of each error data (13, 15, and 17), i.e. the default position of each error data (13, 15, and 17) on the optical disk 10; for example, setting the error data distribution in a guild-in area 12, derived area 16, data recording data 14, etc. The processing ability to each area of errors of the optical disk drive can be observed and tested. Alternately, general errors on optical disks are simulated by a way of random distribution.

Step 204: performing capturing process. The bit value at the default position on the original image file is captured mainly according to the error mode, parameters, and distribution method selected in step 201, step 202, and step 203.

Step 205: performing reversing process. The bit value captured in step 204 is reversed, i.e. reversing the bit value 1 to 0 and the bit thereby forming the error bit as needed.

Step 206: performing storing back processing. Each error data (13, 15, and 17) consisted of error bits is stored back to the default position of the original image file thereby forming a test image file. At this time, since the data at the default position is different from the original image file, the decoding ability and processing ability of running into error data of the optical disk drives can be evaluated by the size and type of the error data.

Step 207: performing writing process. Finally, the test image file is written into an optical disk to obtain a test optical disk.

By implementing previous mentioned steps, the users can set the size and distribution of the error data individually to make test optical disks capable of simulating various error statuses and infinitely replicate the test optical disks to let the error statuses have reproducibility and help developers to improve the optical disk technology.

Finally, in each previous implementing step, in selecting modes and setting parameters in step 201, step 202, and step 203, the implementing order is not limited particularly. As long as completing the setting, the same implemented result will be achieved. Furthermore, in step 201, the error mode of the data can be selected in a form of a combination, i.e. combining partial point error mode, partial error block mode, or partial sequential error area mode. In step 203, partial error data can be selected by setting distribution to designate the falling position of the error, and partial error data can be selected by random distribution to determine the position of the error. This way, various error statuses are further simulated in real thereby providing more efficient test optical disks to evaluate and test the performance of the optical disk drives.

In summary, it is appreciated that the present invention is related to an optical disk and a manufacturing method thereof and more particularly to a test optical disk and a manufacturing method thereof. Not only optical disks simulating various signal error statuses can be manufactured, but also the error statuses have reproducibility to help developers to improve the optical disk technology.

The foregoing description is merely one embodiment of present invention and not considered as restrictive. All equivalent variations and modifications in process, feature, and spirit in accordance with the appended claims may be made in any way from the scope of the invention.

LIST OF REFERENCE SYMBOLS

10 optical disk
11 recording track
12 guild-in area
13 error point
14 data recording area
15 error block
16 derived area
17 sequential error block

The invention claimed is:

1. A test optical disk, comprising:
a recording track for recording original data consisted of a plurality of bits; and at least one error data, each of said error data consisted of at least one error bit and set on a default position of said recording track;

wherein each error bit is obtained by reversing said bits of the corresponding original data on said default position, and said error data is a mode selected from one of an error point, an error block, a sequential error area, and a combination thereof.

2. The optical disk according to claim 1, wherein said error point mode is error data with a length between 1 to 9 error bits for simulating an error status in a small range.

3. The optical disk according to claim 1, wherein said error block mode is error data with a length between 10 to hundreds of error bits for simulating an error status in a bit bigger range.

4. The optical disk according to claim 1, wherein said sequential error area mode is error data continuously periodically and with a length between hundreds to thousands of error bits for simulating an error status in a bigger range.

5. A test optical disk, comprising:

a recording track for recording original data consisted of a plurality of bits; and at least one error data, each of said error data consisted of at least one error bit and set on a default position of said recording track;

wherein each error bit is obtained by reversing said bits of the corresponding original data on said default position, and said default position is generated by a method selected from a random distribution, a setup distribution, and a combination thereof.

6. A manufacturing method of a test optical disk, mainly comprising the steps of:

providing an original image file comprising a plurality of bits;

producing at least one error data each of which is consisted of at least one error bit each of which is obtained by capturing said bit value at said default position in said original image file and reversing it;

storing said error data back to said default position in said original image file thereby forming a test image file; and writing said test image file into an optical disk.

7. The manufacturing method according to claim 6, further comprising a step of setting an error amount for determining the number of said error bits in each error data.

8. The manufacturing method according to claim 6, wherein said error data is a mode selected from error point, error block, sequential error area, and a combination thereof, and said manufacturing method further comprises a step of selecting an error mode for determining said mode of each error data.

9. The manufacturing method according to claim 8, wherein said error data in said error point mode is with a length between 1 to 9 error bits for simulating an error status in a smaller range.

10. The manufacturing method according to claim 8, wherein said error block mode is error data with a length between 10 to hundreds of error bits for simulating an error status in a bit bigger range.

11. The manufacturing method according to claim 8, wherein said sequential error area mode is error data continuously periodically and with a length between hundreds to thousands of error bits for simulating an error status in a bigger range.

12. The manufacturing method according to claim 9, further comprising a step of setting a point error rate when said error data is in said error point mode for determining the number of error bits in said error data, and capturing the number of corresponding bits in said original image file.

13. The manufacturing method according to claim 10, further comprising a step of setting a block error rate and a length of said error block when said error data is in said error block mode for determining the number of error bits in said error data, and capturing the number of corresponding bits in said original image file.

14. The manufacturing method according to claim 11, further comprising a step of setting an error circling rate and a length of said sequential error area when said error data is in said sequential error area for determining the number of error bits in said error data, and capturing the number of corresponding bits in said original image file.

15. The manufacturing method according to claim 8, wherein said default position is generated by a method selected from a random distribution, a setup distribution, and a combination thereof, and said manufacturing method further comprises a step of selecting a distribution method for determining said distribution method of said default position.

* * * * *